US011858166B2

(12) United States Patent
Wang et al.

(10) Patent No.: US 11,858,166 B2
(45) Date of Patent: Jan. 2, 2024

(54) UNIT NARROW BOARD GLUE APPLICATION DEVICE AND METHOD SUITABLE FOR HIGH-FREQUENCY HOT PRESSING OF SOLID WOOD EDGE GLUED PANEL

(71) Applicant: Nanjing Forestry University, Nanjing (CN)

(72) Inventors: Baojin Wang, Nanjing (CN); Qi Xu, Nanjing (CN); Peibin Tian, Nanjing (CN); Yun Zhang, Nanjing (CN); Xinqi Zhu, Nanjing (CN); Song Yang, Nanjing (CN); Xinyu Yan, Nanjing (CN); Anqi Wu, Nanjing (CN); Zhibao Chen, Nanjing (CN); Nanfeng Zhu, Nanjing (CN); Sheping Wang, Nanjing (CN); Jintao Shen, Nanjing (CN)

(73) Assignee: Nanjing Forestry University, Nanjing (CN)

( * ) Notice: Subject to any disclaimer, the term of this patent is extended or adjusted under 35 U.S.C. 154(b) by 0 days.

(21) Appl. No.: 18/192,942

(22) Filed: Mar. 30, 2023

(65) Prior Publication Data

US 2023/0311361 A1 Oct. 5, 2023

(30) Foreign Application Priority Data

Apr. 5, 2022 (CN) ......................... 202210352311.9

(51) Int. Cl.
*B27G 11/00* (2006.01)
*B27D 1/10* (2006.01)

(52) U.S. Cl.
CPC ................ *B27G 11/00* (2013.01); *B27D 1/10* (2013.01); *Y10T 156/1317* (2015.01)

(58) Field of Classification Search
CPC ...... B27G 11/00; B27D 1/10; Y10T 156/1317
See application file for complete search history.

(56) References Cited

U.S. PATENT DOCUMENTS 921,618 A * 5/1909 Murdoch ............... B27G 11/00 156/552
3,844,320 A * 10/1974 Dimter .................. B27G 11/00 144/91

FOREIGN PATENT DOCUMENTS

CN 103419256 A 12/2013
CN 108972755 A 12/2018
CN 210282614 U 4/2020

* cited by examiner

*Primary Examiner* — George R Koch
*Assistant Examiner* — Christopher C Caillouet
(74) *Attorney, Agent, or Firm* — Nitin Kaushik

(57) ABSTRACT

An unit narrow board glue application device and method suitable for high-frequency hot pressing of solid wood edge glued panel is disclosed, including a transverse chain feeding device, a longitudinal roller feeding device and a gluing device. The transverse chain feeding device includes a fixed chain transport mechanism and a movable chain transport mechanism. The longitudinal roller feeding device includes the lifting power roller assembly, the longitudinal feed roller assembly and the pneumatic compression roller assemblies. The gluing device includes a glue pump, a glue application head, and a pneumatic slide table. The front end face of the hollow structure glue application head has a number of small round holes for glue liquid discharge and horizontal glue guiding grooves. The disclosure has a high degree of automation, can give full play to the efficiency of the high-frequency hot press, and is conducive to the intelligent manufacturing of solid wood furniture.

7 Claims, 16 Drawing Sheets

UNIT NARROW BOARD GLUE APPLICATION DEVICE AND METHOD SUITABLE FOR HIGH-FREQUENCY HOT PRESSING OF SOLID WOOD EDGE GLUED PANEL

CROSS-REFERENCE TO RELATED APPLICATIONS

The application claims priority to Chinese patent application No. 202210352311.9, filed on Apr. 5, 2022, the entire contents of which are incorporated herein by reference.

TECHNICAL FIELD

The disclosure is an unit narrow board glue application device and method suitable for high-frequency hot pressing of solid wood edge glued panel, which relates to the field of wood processing, in particular to the automatic manufacturing technology and equipment of solid wood furniture.

BACKGROUND

Solid wood edge glued panel includes edge glued panel and finger jointed lumber panel, which are made by applying glue on one side of the unit narrow board with a smaller width, and then by assembling, hot-pressing and bonding, and are widely used in the field of solid wood furniture manufacturing. The unit narrow board of the edge glued panel is the material all in one piece along the length direction, without splicing, and the differences in texture and color are small. However, the unit narrow board of the finger jointed lumber panel is spliced with short materials through the finger joints in the length direction, due to the existence of longitudinal joints, the differences in texture and color are slightly large. High-frequency hot press is used to press solid wood edge glued panel, which has short hot pressing time and high production efficiency, and is widely used in the production of modern solid wood furniture. Before hot pressing, one side of the unit narrow board needs to be glued first, and then the glued unit narrow boards are assembled into a large panel slab, and then the panel slab is sent to a high-frequency hot press for hot pressing. At present, in the production of solid wood edge glued panel, the glue application of the unit narrow board, the assembly, and the panel slab feeding into the hot press are mainly manual operations, which are labor-intensive and time-consuming, limiting the efficiency of the high-frequency hot press of solid wood edge glued panel. In order to further improve the automation level of the high-frequency hot pressing production process of solid wood edge glued panel, reduce the labor intensity, and give full play to the production efficiency of the high-frequency hot press, it is necessary to connect the gluing of the unit narrow board, the assembly, the panel slab feeding, the high-frequency hot pressing and other process to realize the automatic and continuous production of solid wood edge glued panel, and also conducive to the intelligent manufacturing of solid wood furniture. Gluing of unit narrow board is an important part in the production of solid wood edge glued panel. At present, there are two ways to apply glue to the unit narrow board: gluing by a roller gluing machine and manual gluing. The axis of the gluing roller of the existing roller gluing machine is horizontally arranged. The glue liquid is poured into the glue tank, and the motor drives the gluing roller to rotate, before gluing, the width direction of the unit narrow board needs to be erected manually to make the side face up to be horizontal, and then sent to the roller gluing machine. The gluing roller dips the glue liquid to the side of the unit narrow board. After gluing, the unit narrow board is laid flat to make the side face vertical. There are many procedures, which affect the efficiency. Manual gluing uses gluing roller or brush, which has low production efficiency, and the gluing quantity and uniformity are difficult to be guaranteed, thus affecting the gluing quality of solid wood edge glued panel. In addition, when applying glue manually, it is also necessary to erect the width direction of the unit narrow board first, and then lay the unit narrow board flat after applying glue, which is not efficient. Therefore, the existing roller gluing machine and manual gluing can not meet the automatic production requirements of high-frequency hot pressing of solid wood edge glued panel, and become the bottleneck affecting the production efficiency of high-frequency hot press.

SUMMARY

The present disclosure provides an unit narrow board glue application device and method suitable for high-frequency hot pressing of solid wood edge glued panel, which aims to solve the problems of multiple processes, multiple labor, low efficiency and high labor intensity in the unit narrow board gluing section in the automatic production process of high-frequency hot pressing of solid wood edge glued panel.

The technical solution provided by the present disclosure: An unit narrow board glue application device suitable for high-frequency hot pressing of solid wood edge glued panel, including a transverse chain feeding device 1, a longitudinal roller feeding device 2 and a gluing device 3.

The transverse chain feeding device 1 includes a fixed chain transport mechanism 11, a movable chain transport mechanism 12, a horizontal linear rolling guide rail 13, a rolling slide block 14, guide wheels 15 and a transverse frame 16, wherein a front end of the fixed chain transport mechanism 11 is fixedly installed on a ground by a support leg, and a rear end is supported on the longitudinal feed frame 28 in the longitudinal roller feeding device 2; a front end of the movable chain transport mechanism 12 is supported on the ground by a support leg and a caster 122, a rear end is supported on the horizontal linear rolling guide rail 13 by the rolling slide block 14, the horizontal linear rolling guide rail 13 is fixed on the transverse frame 16, and the transverse frame 16 is fixed on the ground; the movable chain transport mechanism 12 is capable to move along the horizontal linear rolling guide rail 13; there are eight of the guide wheels 15 in total, which are arranged vertically along the axes of the guide wheels 15, arranged along a longitudinal feed direction of the unit narrow board 4, and fixed on a top of the transverse frame 16 to limit a continuous transverse motion of the unit narrow board 4 and serve as a guide reference for a longitudinal feed of the unit narrow board 4.

The longitudinal roller feeding device 2 includes a lifting power roller assembly 21, front pneumatic compression roller assemblies 22, a longitudinal feed roller assembly 23, rear pneumatic compression roller assemblies 29, guide rollers 24, a first sensor 25, a second sensor 26, a third sensor 27, a longitudinal feed frame 28, a first sensor bracket 281, a second sensor bracket 282 and a third sensor bracket 283.

The lifting power roller assembly 21 includes two lifting power rollers 211, two sets of lifting slide blocks 212, two vertical linear guide rails 213, a lifting power roller motor 214, a chain wheel 215, a first chain 216, a lifting cylinder 217 and a lifting slide seat 218, wherein the two lifting power rollers 211, the lifting power roller motor 214 and a chain drive pair composed of the chain wheel 215 and the first chain 216 are arranged on the lifting slide seat 218; the lifting power roller motor 214 drives the lifting power roller 211 to rotate through the chain drive pair composed of the chain wheel 215 and the first chain 216, and a speed of the lifting power roller motor 214 is stepless adjusted; the two vertical linear guide rails 213 are fixed at a lower part of the longitudinal feed frame 28, and the lifting slide seat 218 is installed on the two vertical linear guide rails 213 through the two sets of lifting slide blocks 212; a cylinder barrel of the lifting cylinder 217 is arranged at the lower part of the longitudinal feed frame 28; a piston rod of the lifting cylinder 217 is connected with a lower part of the lifting slide seat 218; the lifting cylinder 217 drives the lifting slide seat 218 to rise and fall along the two vertical linear guide rails 213, so as to control the two lifting power rollers 211 to rise or fall; the two lifting power rollers 211 are respectively located on both sides of a rear end of the fixed chain transport mechanism 11.

There are two sets of the front pneumatic compression roller assemblies 22, which are installed on an upper part of the longitudinal feed frame 28 and located above an upper part of the lifting power roller assembly 21, respectively corresponding to the two lifting power rollers 211.

The longitudinal feed roller assembly 23 includes a longitudinal feed motor 231, a coupling 232, six worm gear reducers 233, and six longitudinal feed rollers 234, wherein the longitudinal feed motor 231 is connected with a worm of a sixth worm gear reducer 233 along the longitudinal feed direction of the unit narrow board 4, and the worms of two adjacent worm gear reducers 233 are connected through the coupling 232; each of the six longitudinal feed rollers 234 is installed on a worm gear shaft of each of the six worm gear reducers 233; the longitudinal feed motor 231 and the six worm gear reducers 233 are arranged on the upper part of the longitudinal feed frame 28; installation heights of the six worm gear reducers 233 are identical, and installation heights of the six longitudinal feed rollers 234 are identical; the six longitudinal feed rollers 234 are driven by the longitudinal feed motor 231 through the six worm gear reducers 233, and a speed and a rotation direction of the six longitudinal feed rollers 234 are the same; a speed of the longitudinal feed motor 231 is capable to be adjusted steplessly; a diameter of the six longitudinal feed rollers 234 is the same as that of the two lifting power rollers 211;

There are six sets of the rear pneumatic compression roller assemblies 29, which are installed on the upper part of the longitudinal feed frame 28 and located above the longitudinal feed roller assembly 23, respectively corresponding to the six longitudinal feed rollers 234.

There are six of the guide rollers 24, axes of six of the guide rollers 24 are vertically arranged; the guide rollers 24 are installed on the longitudinal feed frame 28 and arranged in the same line with the eight of the guide wheels 15, and a diameter of the guide rollers 24 is the same as that of the guide wheels 15, which are configured to provide a longitudinal feed reference for the unit narrow board 4.

The gluing device 3 includes a glue pump 31, a glue barrel 32, a glue application head 33, a glue delivery hose 34, a slide table fixed frame 35, and a pneumatic slide table 36, wherein the pneumatic slide table 36 includes a slide table cylinder 361, a slide table guide rail 362, and a slide table seat 363; an upper surface of the slide table cylinder 361 is provided with a sliding groove matched with the slide table guide rail 362; the slide table seat 363 is fixed on the slide table fixed frame 35, and the slide table fixed frame 35 is fixed on the longitudinal feed frame 28; along the longitudinal feed direction of the unit narrow board 4, the gluing device 3 is located between the fourth longitudinal feed roller 234 and the fifth longitudinal feed roller 234 in the longitudinal feed roller assembly 23; a first glue inlet of the glue pump 31 is connected to the glue barrel 32 through a pipe, one end of the glue delivery hose 34 is connected to the glue outlet of the glue pump 31, and the other end is connected to the glue application head 33; a rotation speed of the glue pump 31 is capable to be adjusted steplessly; an upper part of the glue application head 33 is fixed on a lower surface of a cylinder block of the slide table cylinder 361, the cylinder block of the slide table cylinder 361 is suspended on the slide table guide rail 362 through a sliding groove on the upper surface of the slide table cylinder 361, the slide table cylinder 361 is a double cylinder parallel piston type single-piston rod double-acting cylinder, and a piston rod of the slide table cylinder 361 is connected with the slide table seat 363; the cylinder block of the slide table cylinder 361 is movable, so as to make the glue application head 33 to move in the direction perpendicular to the longitudinal feed direction of the unit narrow board 4; along the longitudinal feed direction of the unit narrow board 4, when a rodless cavity of the slide table cylinder 361 is filled with compressed air, a front end face of the glue application head 33 moves to a glue application position 2 mm to a left side of a guide surface composed of six of the guide rollers 24.

Along the longitudinal feed direction of the unit narrow board 4, the first sensor 25 is located between a first front compression roller with bearing 2241 and a second front compression roller with bearing 2242, and is arranged on the upper part of the longitudinal feed frame 28 through the first sensor bracket 281; the second sensor 26 is located between the second front compression roller with bearing 2242 and the first rear compression roller with bearing 2941, and is installed on the upper part of the longitudinal feed frame 28 through the second sensor bracket 282; the third sensor 27 is located between the second rear compression roller with bearing 2942 and the third rear compression roller with bearing 2943, and is installed on the upper part of the longitudinal feed frame 28 through the third sensor bracket 283.

The glue application head 33 is a hollow structure, a rear end face of the glue application head 33 is provided with a second glue inlet, a front end face of the glue application head 33 is a vertical plane parallel to the longitudinal feed direction of the unit narrow board 4, and there are chamfered inclined planes between the front end face and the two sides of the glue application head 33; a plurality of horizontal glue guiding grooves with identical width and depth vertically arranged and distributed from a middle to a left on the front end face, and a spacing between two adjacent horizontal glue guiding grooves is equal; small round holes for glue liquid discharge are provided at a right end of each of the plurality of horizontal glue guiding grooves, the small round holes are communicated with a chamber in the glue application head 33, and all the small round holes are arranged on the same vertical line; the right end of each of the plurality of horizontal glue guiding grooves is a semi-circular closed structure, while the left end of each of the plurality of horizontal glue guiding grooves is an open structure, so as to guide glue liquid discharged from the small round holes, so that the glue liquid adhered to a side of the unit narrow board 4 forms parallel glue lines.

The fixed chain transport mechanism 11 includes a first servo drive unit 111, a first edge baffle 112 and a first conveyor chain assembly 113; the first conveyor chain assembly 113 includes a second chain, a driving chain wheel, a driven chain wheel, a chain carrier plate and a support plate, and the first conveyor chain assembly 113 is driven by the first servo drive unit 111; along the transverse feed direction of the unit narrow board 4, the first edge baffle 112 is located on a left side of the first conveyor chain assembly 113 and configured to align a left end of the unit narrow board 4.

The movable chain transport mechanism 12 includes a second servo drive unit 121, a caster 122, a second edge baffle 123 and a second conveyor chain assembly 124; a structure of the second conveyor chain assembly 124 is the same as that of the first conveyor chain assembly 113, and the second conveyor chain assembly 124 is driven by the second servo drive unit 121; along the transverse feed direction of the unit narrow board 4, the second edge baffle 123 is located on a right side of the second conveyor chain assembly 124 and configured to limit a right movement of the unit narrow board 4; and the running speed and direction of the second conveyor chain assembly 124 are consistent with those of the first conveyor chain assembly 113.

Each of the front pneumatic compression roller assemblies 22 includes a front compression cylinder 221, a front fisheye joint 222, a front compression roller seat 223, a front compression roller with bearing 224, a front rolling slide block 225, a front rolling guide rail 226; the front compression cylinder 221 is fixed on a beam at the upper part of the longitudinal feed frame 28, a piston rod of the front compression cylinder 221 is connected with the front compression roller seat 223 through the front fisheye joint 222, the front compression roller with bearing 224 is installed on the front compression roller seat 223 through a shaft, the front compression roller seat 223 is connected with the front rolling slide block 225, the front rolling slide block 225 is installed on the front rolling guide rail 226, and the front rolling guide rail 226 is vertically fixed on the upper part of the longitudinal feed frame 28, the front compression cylinder 221 is capable to drive the front compression roller with bearing 224 to rise and fall; and the structure and installation method of each of the rear pneumatic compression roller assemblies 29 are the same as those of the front pneumatic compression roller assemblies 22.

A height of the glue application head 33 meets a requirement of a maximum thickness of the unit narrow board 4, and the number of small round holes for gluing on a front end face of the glue application head 33 is determined according to the thickness of the unit narrow board 4.

The working method of the unit narrow board glue application device suitable for high-frequency hot pressing of solid wood edge glued panel, including the following steps:

Step 1, starting the longitudinal feed motor 231 and the lifting power roller motor 214 to rotate the six longitudinal feed rollers 234 and the two lifting power rollers 211, and adjusting the rotation speed; then starting the first servo drive unit 111 and the second servo drive unit 121 to make the fixed chain transport mechanism 11 and the movable chain transport mechanism 12 operate synchronously, and adjusting the operation speed; injecting compressed air into a rod cavity of the lifting cylinder 217 to lower the two lifting power rollers 211 to a lowest initial position; at the same time, injecting compressed air into rod cavities of the front compression cylinder 221 of the two sets of the front pneumatic compression roller assemblies 22 located above the lifting power roller assembly 21, so that the two front compression rollers with bearings 224 are lifted to a highest initial position; then injecting compressed air into the rodless cavities of the rear compression cylinders 291 of the six sets of rear pneumatic compression roller assemblies 29 located above the longitudinal feed roller assembly 23 to lower six rear compression rollers with bearings 294 to a predetermined working height; injecting compressed air into a rod cavity of the slide table cylinder 361 to make the glue application head 33 at an initial position on a right side; setting the rotation speed of the glue pump 31 to control glue liquid of the glue pump 31 according to requirements of a longitudinal feed speed and a glue amount of the unit narrow board 4.

Step 2, placing a plurality of unit narrow boards 4 on the transverse chain feeding device 1 by a manipulator or other loading device, and a left end of the unit narrow board 4 is aligned with the first edge baffle 112; the unit narrow board 4 is transferred to a rear end of the transverse chain feeding device 1, so that a side of the unit narrow board 4 to be glued is close to the guide wheels 15 and the guide rollers 24; along the longitudinal feed direction of the unit narrow board 4, a front section of the unit narrow board 4 is located at the lifting power roller assembly 21.

Step 3, sending, by a control system, a signal to control the first servo drive unit 111 and the second servo drive unit 121 to stop synchronously when the first sensor 25 detects that the unit narrow board 4 reaches the rear end of the transverse chain feeding device 1, so as to stop a transverse feeding movement; at the same time, the lifting power roller assembly 21 is lifted under an action of the lifting cylinder 217, so that the height of the two lifting power rollers 211 is the same as that of the six longitudinal feed rollers 234; at the same time, the two front compression rollers with bearings 224 located above the lifting power roller assembly 21 are driven down by the front compression cylinder 221, and then to press on an upper surface of the unit narrow board 4, so that the unit narrow board 4 starts a longitudinal feed motion under a longitudinal feed driving force; when the unit narrow board 4 enters a region of the longitudinal feed roller assembly 23, the longitudinal feed motion continues under an action of the longitudinal feed rollers 234 and the six rear compression rollers with bearings 294 located above the longitudinal feed rollers 234;

Step 4, sending, by the control system, a control signal to the lifting cylinder 217 and the front compression cylinder 221, the glue pump 31, and the slide table cylinder 361 when the third sensor 27 detects a front end of the unit narrow board 4, so as to control the two lifting power rollers 211 to lower and the two front compression rollers with bearings 224 to lift, to disengage from the unit narrow board 4 and return to the initial positions; at the same time, the piston rod of the slide table cylinder 361 is controlled to stretch out, and the cylinder block moves to a glue position with the glue application head 33 towards the unit narrow board 4; at the same time, the glue pump 31 is controlled to start and supply glue liquid to the glue application head 33; with the longitudinal feed of the unit narrow board 4, when the front end of the unit narrow board 4 contacts the chamfered inclined planes of the glue application head 33, a right lateral thrust is generated on the glue application head 33, which overcomes a force of the slide table cylinder 361 and makes the glue application head 33 move backward to the right, so that a front end face of the glue application head 33 is floating and pressing on the side of the unit narrow board 4 under an action of the slide table cylinder 361; the glue liquid is discharged from the small round holes on the front end face of the glue application head 33 and adhered to the side of the unit narrow board 4, with the longitudinal feed of the unit narrow board 4, the glue liquid forms multiple horizontal glue lines with equal spacing on the side of the unit narrow board 4, and the glue lines are evenly distributed on a gluing surface under an action of pressure during the subsequent assembly and hot pressing; with continued feeding of the unit narrow board 4 along the longitudinal direction, sending, by the control system, a delay control signal to the glue pump 31 when the third sensor 27 detects a rear end of the unit narrow board 4, so that the side of the unit narrow board 4 is completely glued, and then the glue pump 31 is controlled to stop, and the piston rod of the slide table cylinder 361 is retraced, and the cylinder block moves back with the glue application head 33 to separate away from the unit narrow board 4, so as to complete the gluing of the first unit narrow board 4.

Step 5, sending, by the control system, a signal to the transverse chain feeding device 1 to make the first servo drive unit 111 and the second servo drive unit 121 start synchronously again when the second sensor 26 detects that the rear end of the unit narrow board 4 is passing, so that the fixed chain transport mechanism 11 and the movable chain transport mechanism 12 resume operation, and the unit narrow board 4 is moved laterally by a distance of a width of the unit narrow board 4; at the same time, the longitudinal roller feeding device 2 and the gluing device 3 are started again to carry out a transverse feeding, a longitudinal feeding and a side glue application of a next unit narrow board 4, so as to cycle back and forth.

The advantageous effects of the present disclosure:

(1) The unit narrow board glue application device of the present disclosure, in cooperation with the high-frequency hot press of the solid wood edge glued panel and other devices, can realize the automation and continuity of the high-frequency hot pressing production process of the solid wood edge glued panel, give full play to the efficiency of the high-frequency hot press, and facilitate the intelligent manufacturing of the solid wood products.

(2) It can reduce the number of workers, labor intensity and production costs.

(3) It is not necessary to erect the width direction of the unit narrow board, directly apply glue on the vertical side, and the process is simplified.

(4) It can meet the requirements of glue application on the side of unit narrow boards with different specifications in length, width and thickness.

(5) Since the amount of glue applied is uniform and adjustable, it can meet the requirements for the gluing quality of solid wood edge glued panel.

Reference numbers in the figures, 1—transverse chain feeding device, 2—longitudinal roller feeding device, 3—gluing device, 4—unit narrow board;

11—fixed chain transport mechanism, 111—first servo drive unit, 112—first edge baffle, 113—first conveyor chain assembly;

12—movable chain transport mechanism, 121—second servo drive unit, 122—caster, 123—second edge baffle, 124—second conveyor chain assembly;

13—horizontal linear rolling guide rail, 14—rolling slide block, 15—guide wheel, 16—transverse frame;

21—lifting power roller assembly, 211—lifting power roller, 212—lifting slide block, 213—vertical linear guide rail, 214—lifting power roller motor, 215—chain wheel, 216—first chain, 217—lifting cylinder, 218—lifting slide seat;

22—front pneumatic compression roller assembly, 221—front compression cylinder, 222—front fisheye joint, 223—front compression roller seat, 224—front compression roller with bearing; 2241—first front compression roller with bearing, 2242—second front compression roller with bearing; 225—front rolling slide block, 226—front rolling guide rail;

23—longitudinal feed roller assembly, 231—longitudinal feed motor, 232—coupling, 233—worm gear reducer, 234—longitudinal feed roller;

24—guide roller, 25—first sensor, 26—second sensor, 27—third sensor, 28—longitudinal feed frame, 281—first sensor bracket, 282—second sensor bracket, 283—third sensor bracket;

29—rear pneumatic compression roller assembly, 291—rear compression cylinder, 292—rear fisheye joint, 293—rear compression roller seat, 294—rear compression roller with bearing; 2941—first rear compression roller with bearing, 2942—second rear compression roller with bearing, 2943—third rear compression roller with bearing; 2944—fourth rear compression roller with bearing, 2945—fifth rear compression roller with bearing; 2946—sixth rear compression roller with bearing;

31—glue pump, 32—glue barrel, 33—glue application head, 34—glue delivery hose, 35—slide table fixed frame, 36—pneumatic slide table, 361—slide table cylinder, 362—slide table guide rail, 363—slide table seat.

DETAILED DESCRIPTION OF THE EMBODIMENTS

Figure 1:
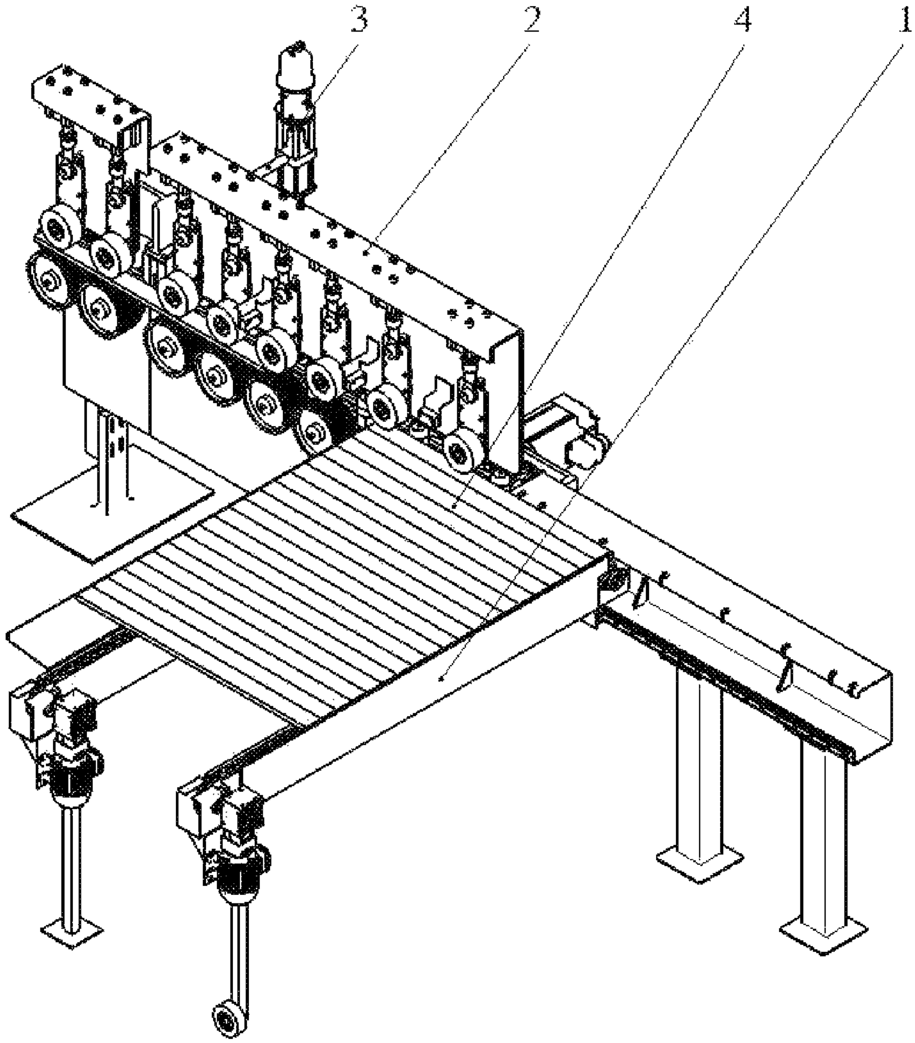
FIG. 1 is a structural perspective view of the unit narrow board glue application device of the present disclosure.
Figure 2:
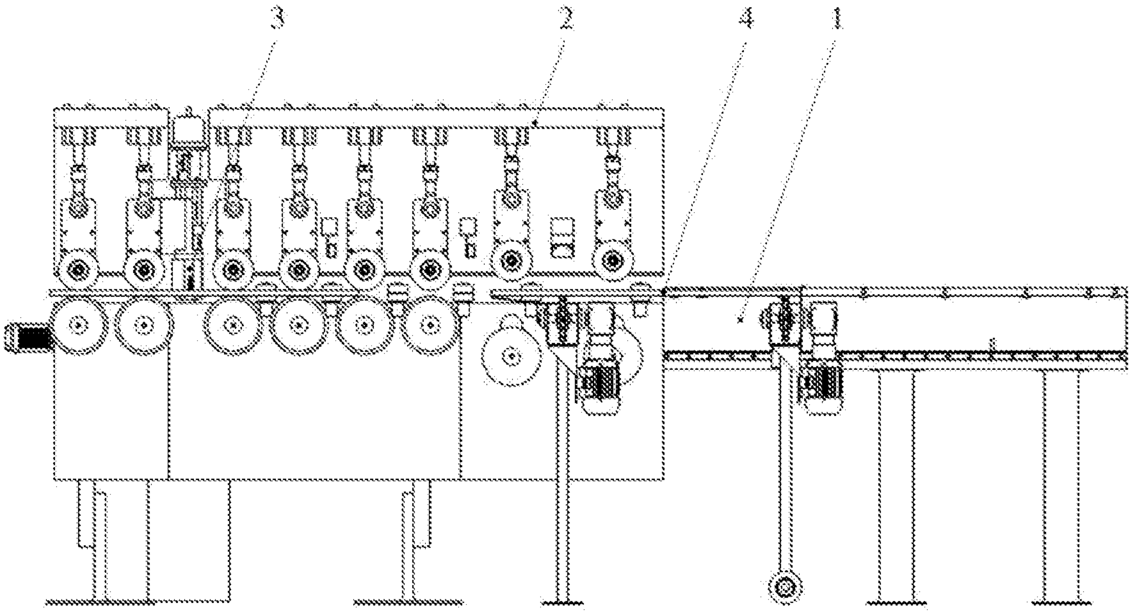
FIG. 2 is a front view of the unit narrow board glue application device of the present disclosure.
Figure 3:
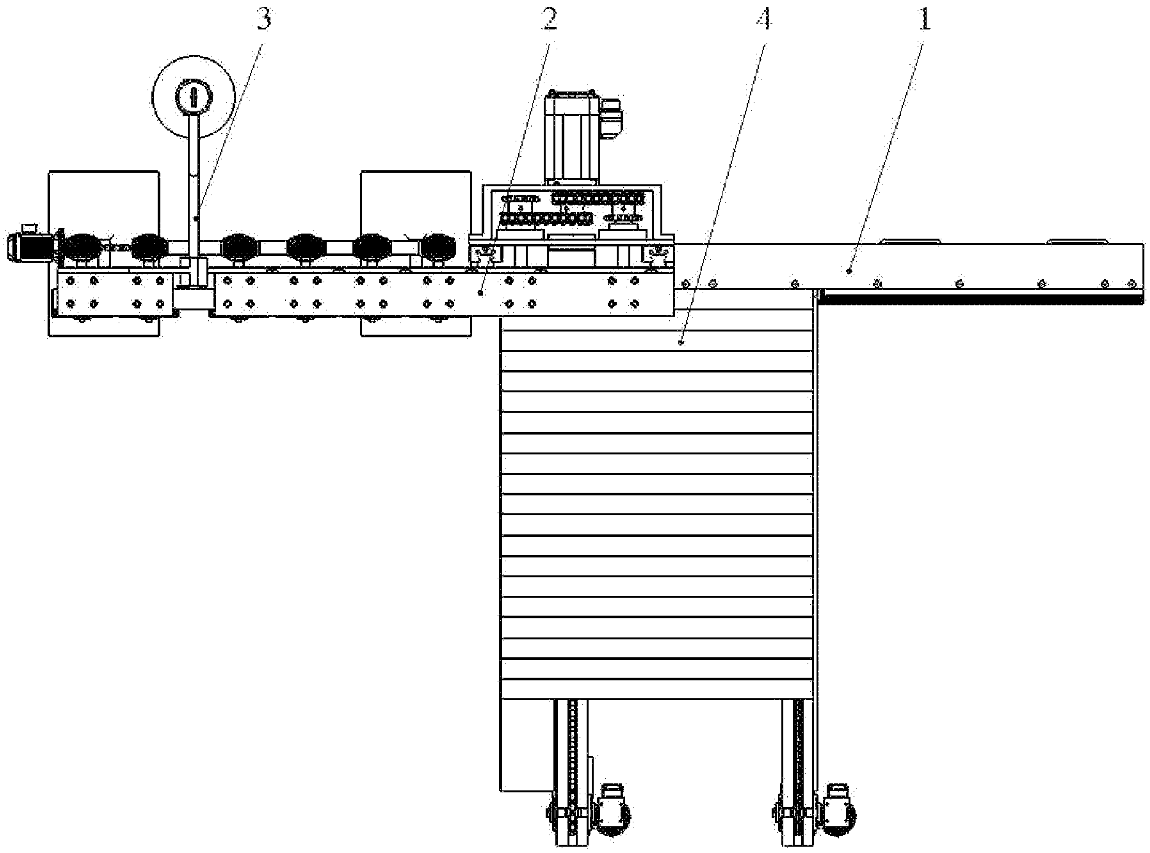
FIG. 3 is a top view of the unit narrow board glue application device of the present disclosure.
Figure 4:
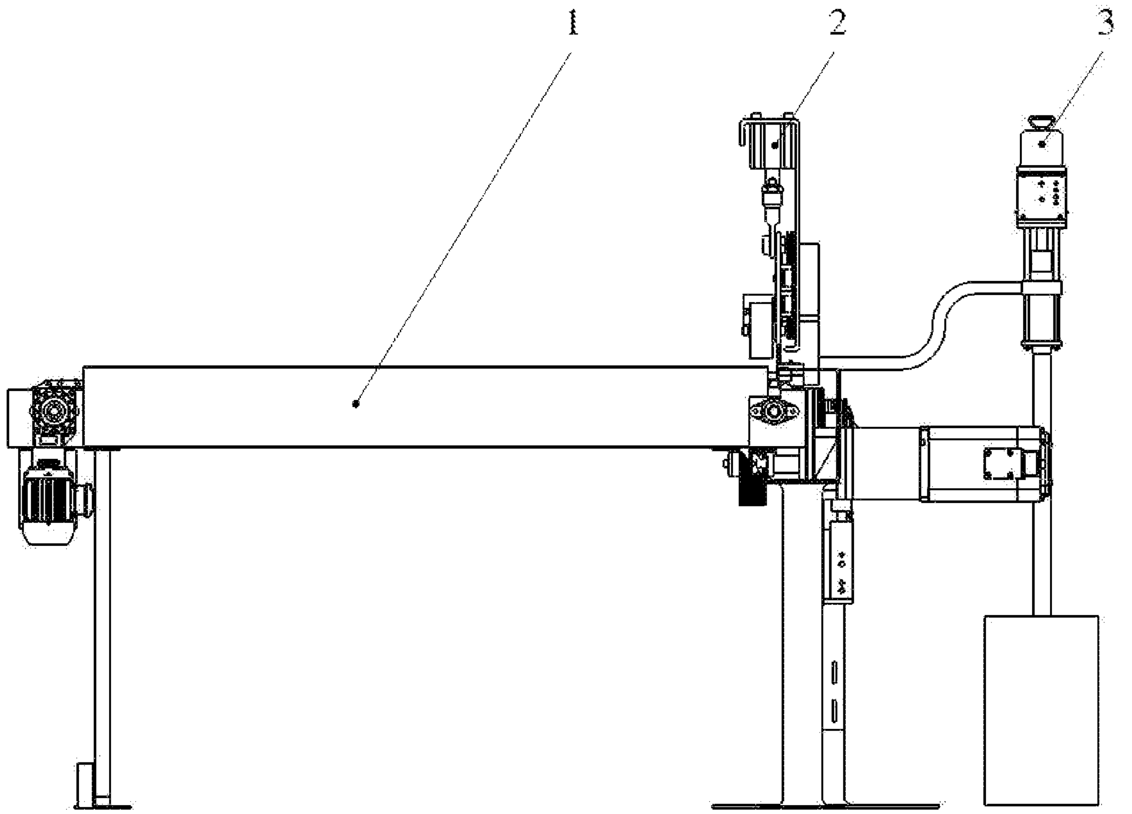
FIG. 4 is a left view of the unit narrow board glue application device of the present disclosure.
Figure 5:
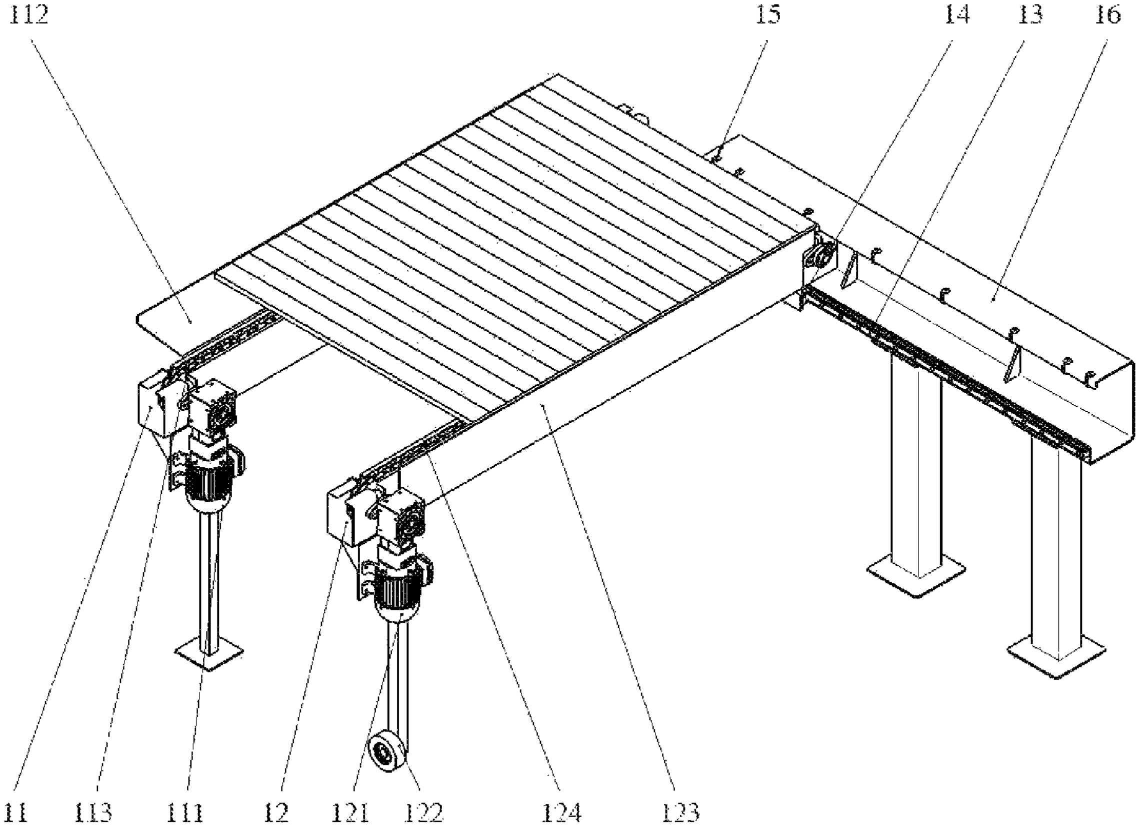
FIG. 5 is a structural perspective view of the transverse chain feeding device of the present disclosure.
Figure 6:
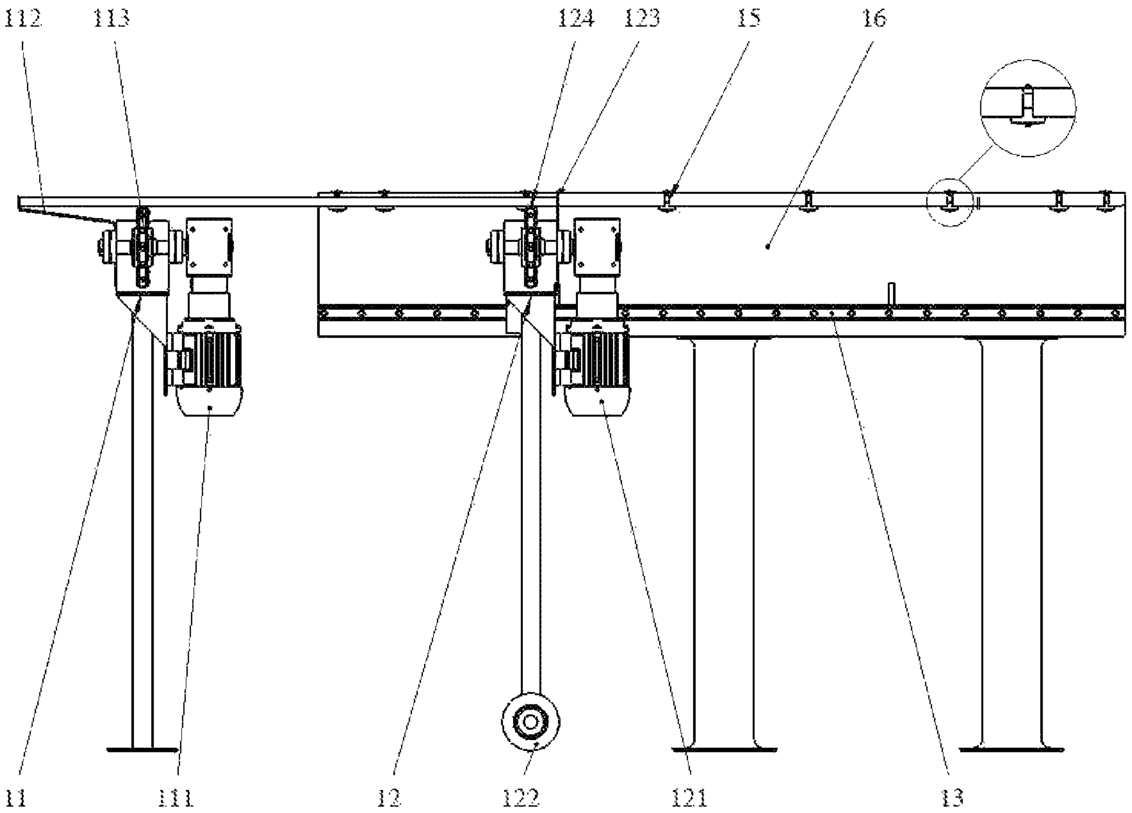
FIG. 6 is a front view of the transverse chain feeding device of the present disclosure.
Figure 7:
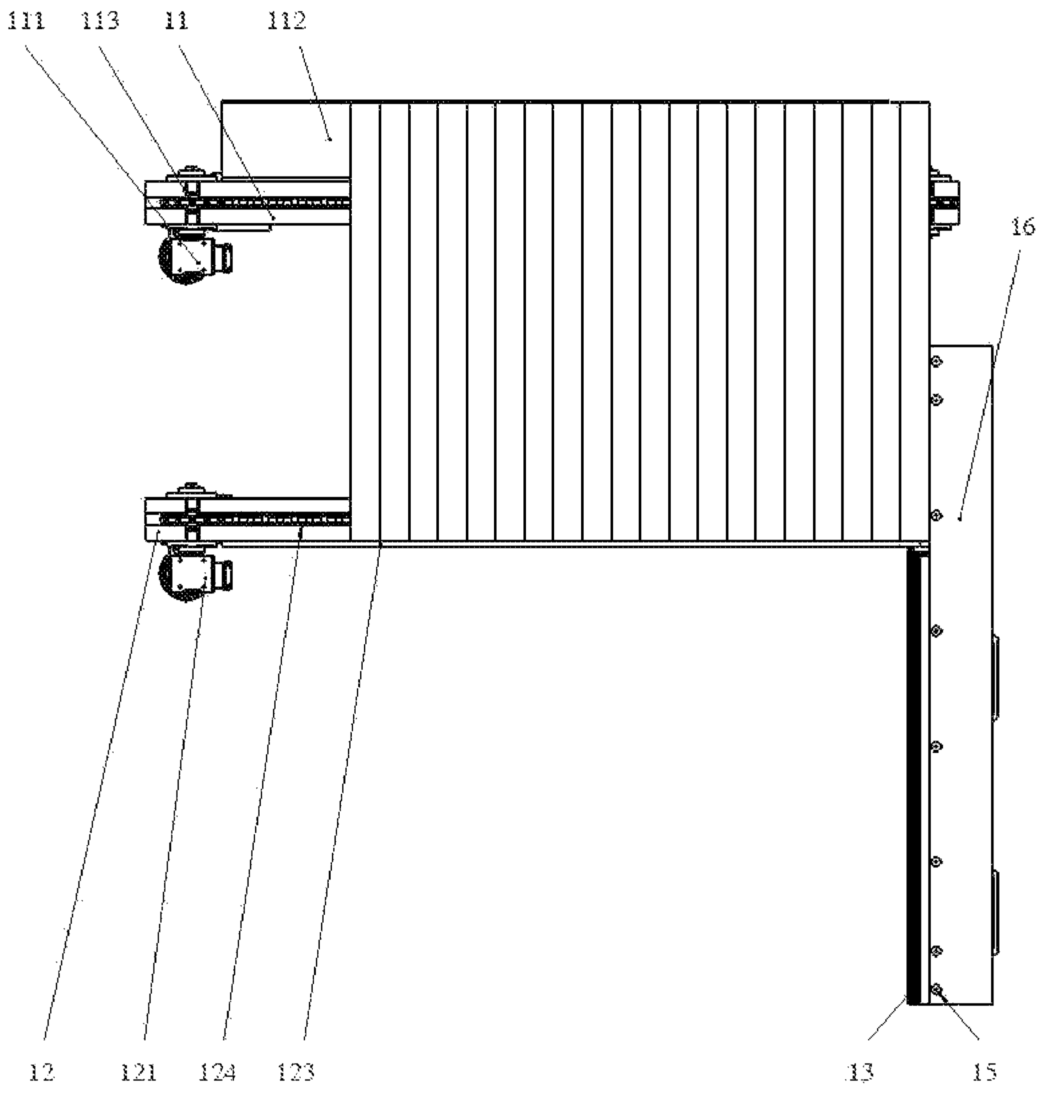
FIG. 7 is a top view of the transverse chain feeding device of the present disclosure.
Figure 8:
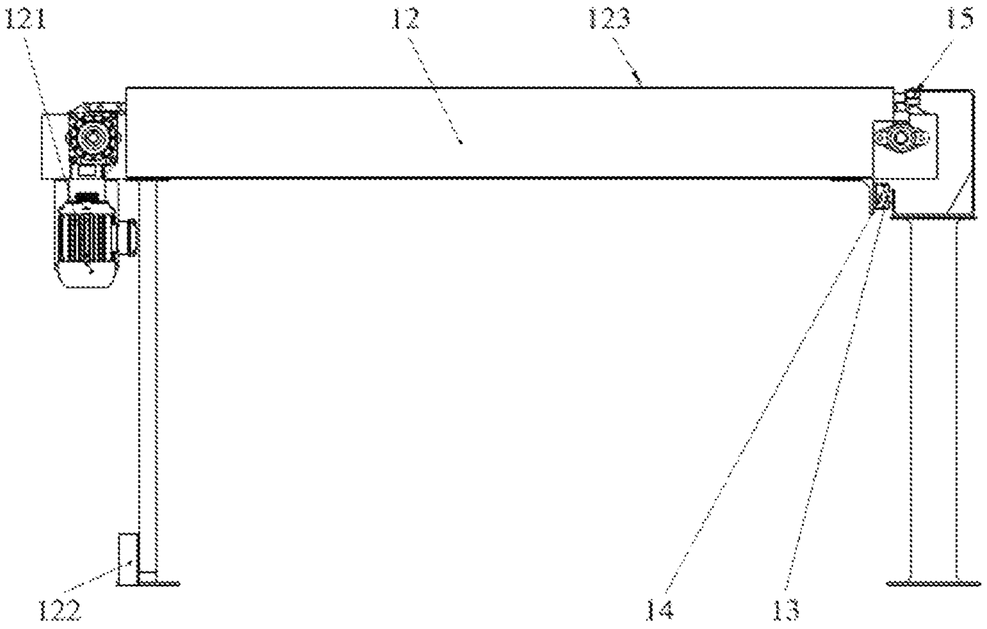
FIG. 8 is a left view of the transverse chain feeding device of the present disclosure.
Figure 9:
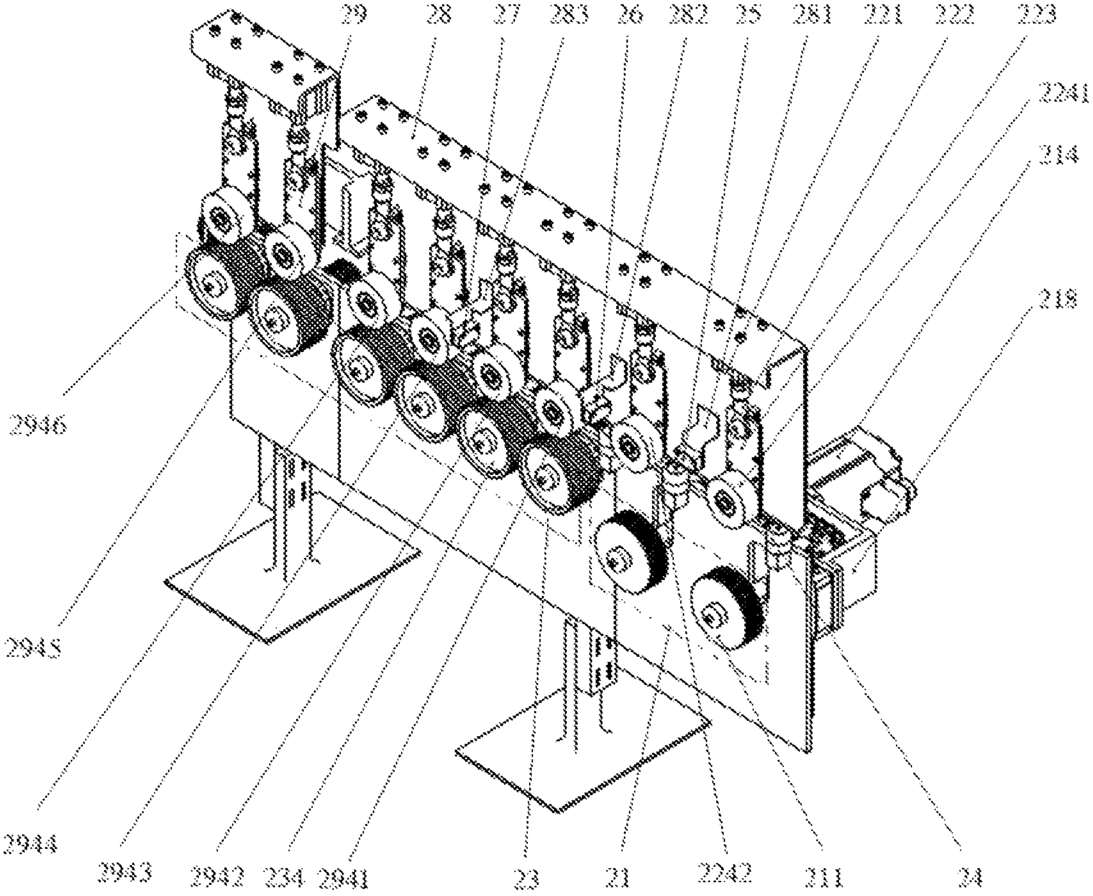
FIG. 9 is a structural perspective view of the longitudinal roller feeding device of the present disclosure.
Figure 10:
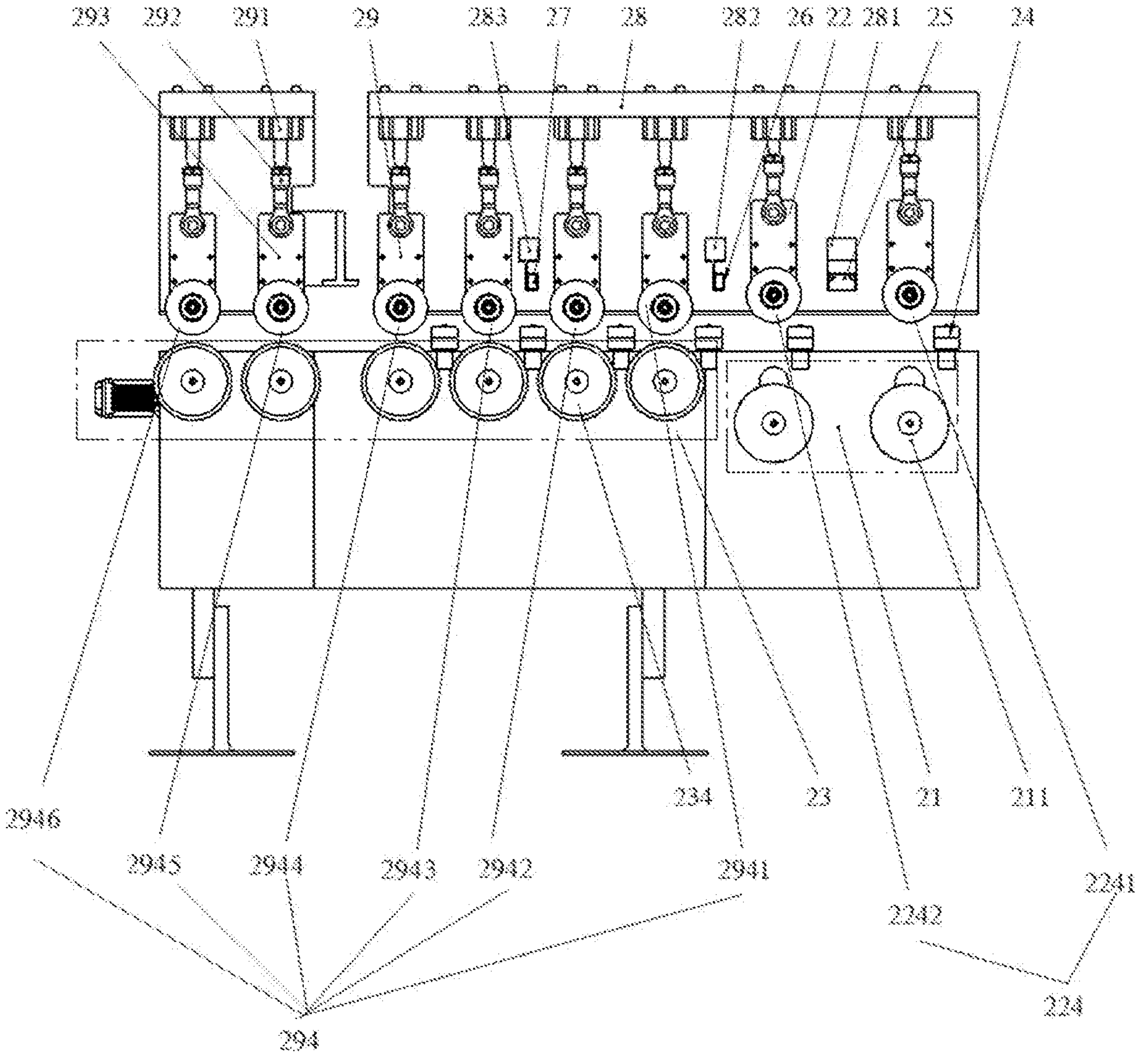
FIG. 10 is a front view of the longitudinal roller feeding device of the present disclosure.
Figure 11:
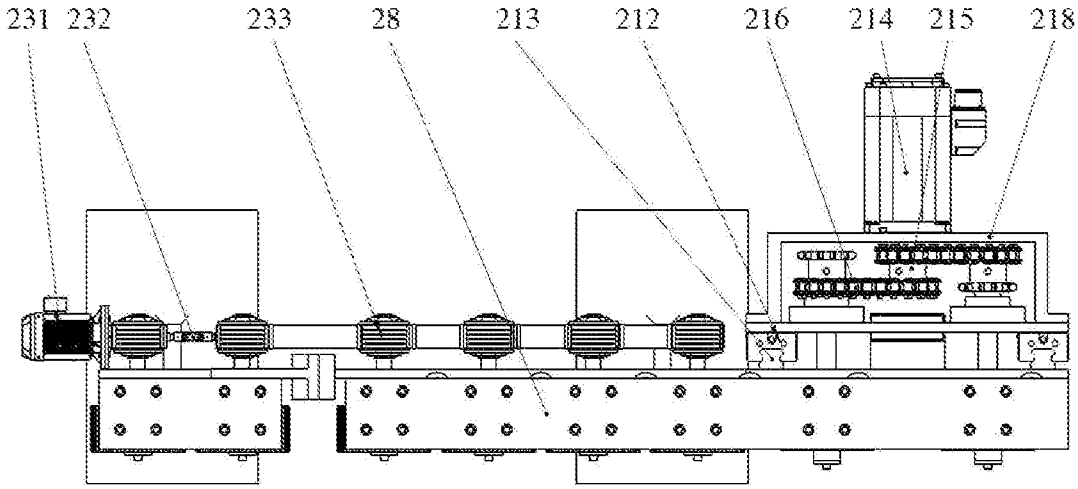
FIG. 11 is a top view of the longitudinal roller feeding device of the present disclosure.
Figure 12:
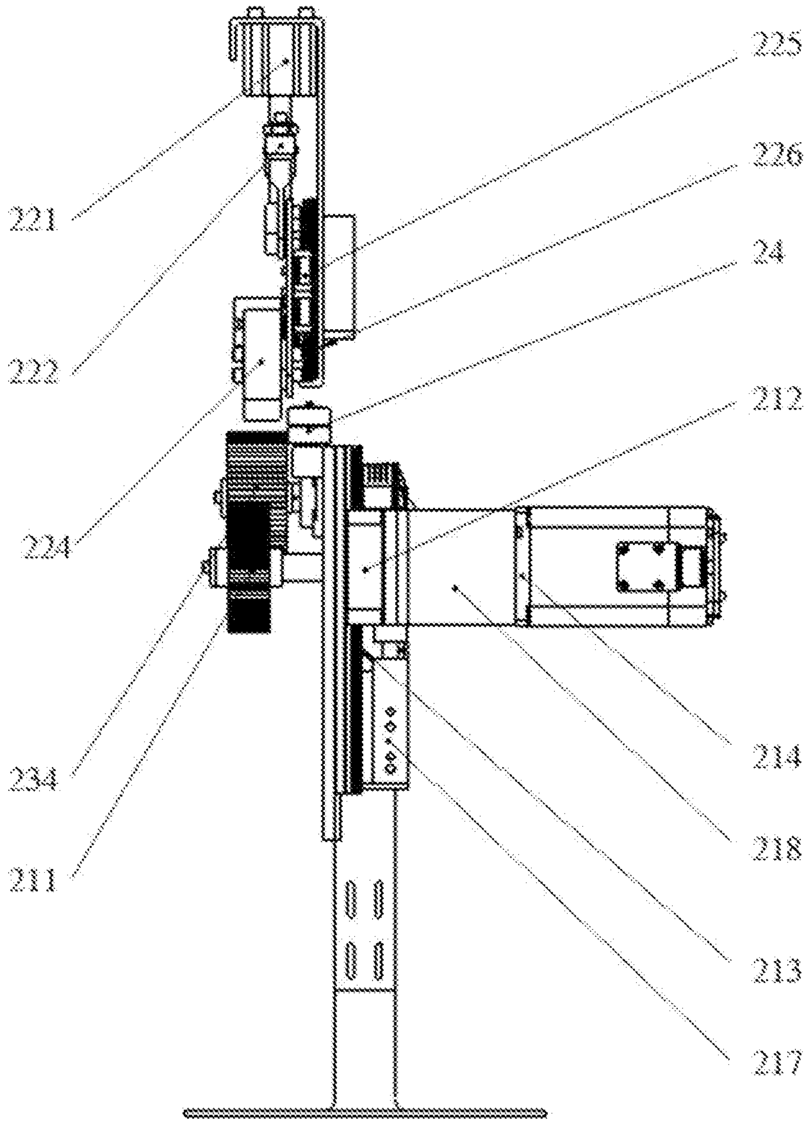
FIG. 12 is a left view of the longitudinal roller feeding device of the present disclosure.
Figure 13:
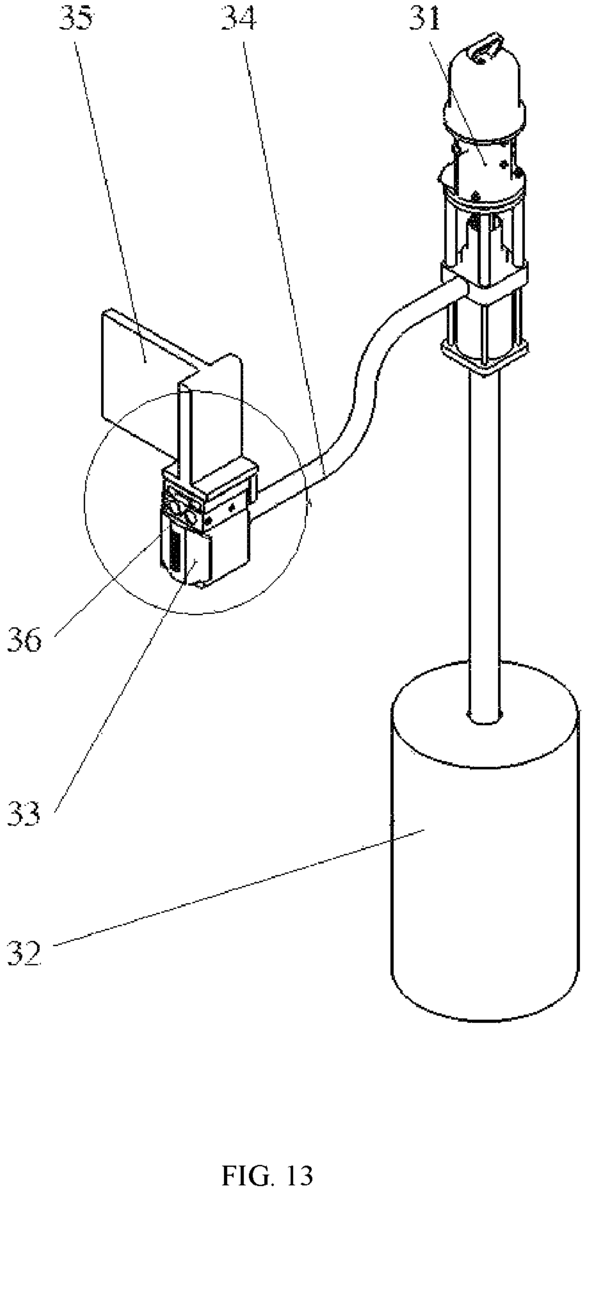
FIG. 13 is a structural perspective view of the gluing device of the present disclosure.
Figure 14:
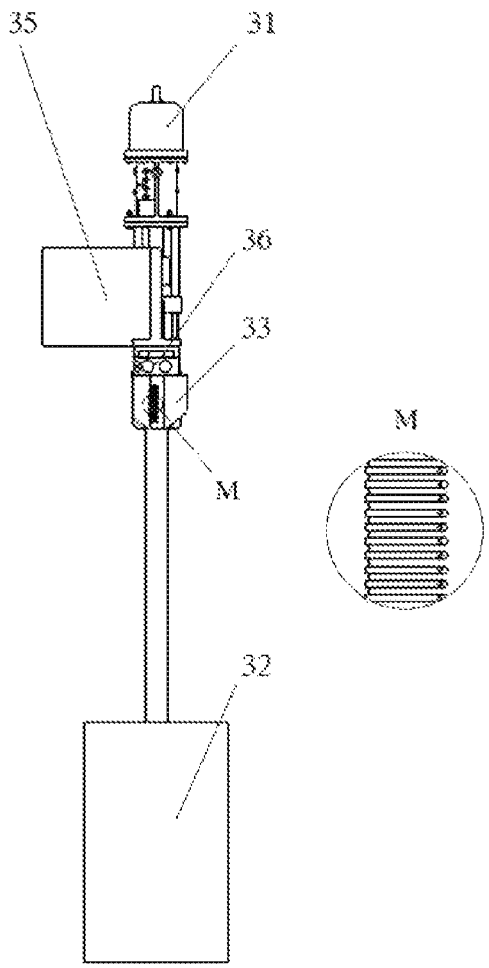
FIG. 14 is a front view of the gluing device of the present disclosure.
Figure 15:
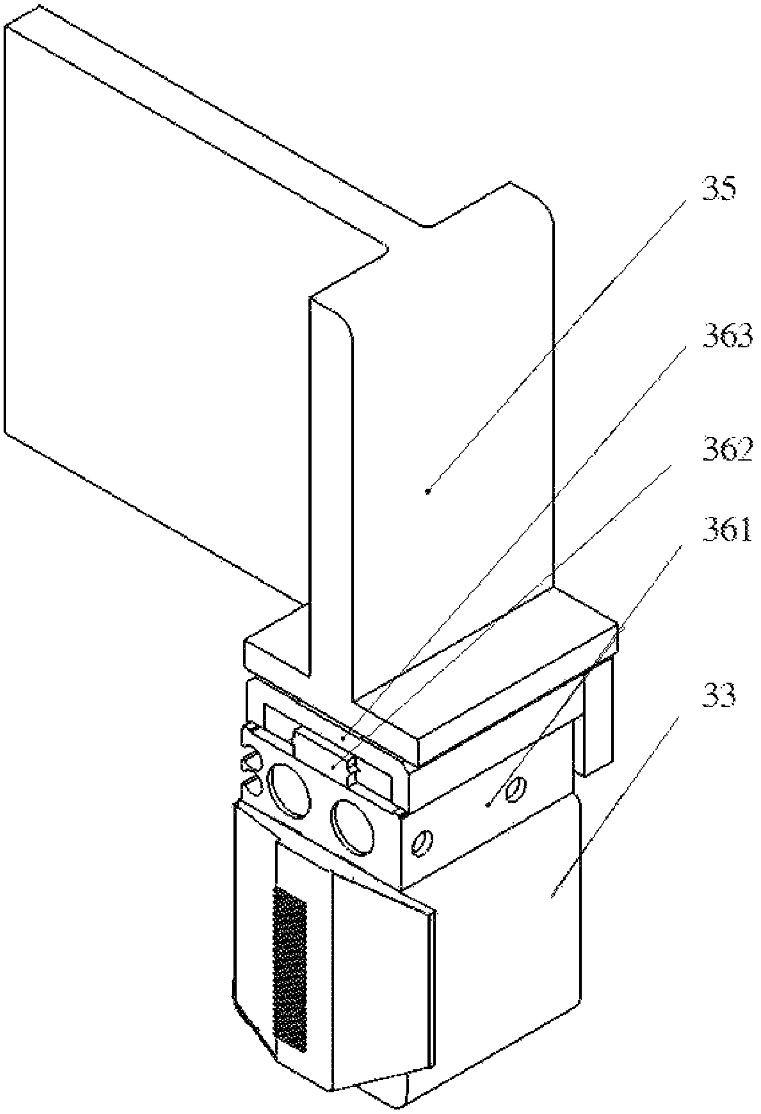
FIG. 15 is a structural perspective view of the glue application head and pneumatic slide table of the present disclosure.
Figure 16:
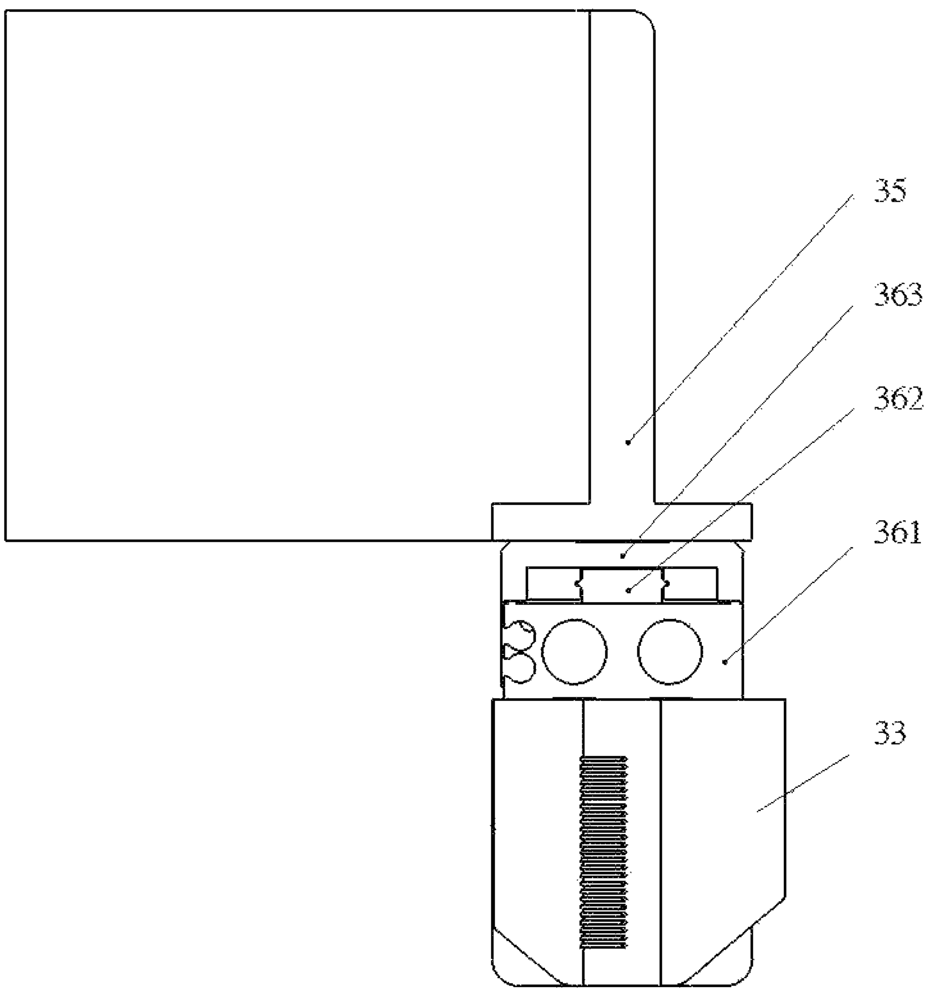
FIG. 16 is a front view of the glue application head and pneumatic slide table of the present disclosure.

The specific embodiments of the present disclosure will be further described in combination with FIGS. 1 to 16.

An unit narrow board glue application device suitable for high-frequency hot pressing of solid wood edge glued panel, including a transverse chain feeding device 1, a longitudinal roller feeding device 2 and a gluing device 3. The transverse chain feeding device 1 is used to transversely transport the unit narrow board 4 to the longitudinal roller feeding device 2, and also acts as a buffer bin for the unit narrow board 4. The longitudinal roller feeding device 2 is used to turn the unit narrow board 4 from the transverse motion to the longitudinal feeding movement one by one in order to make the unit narrow board 4 carry out side gluing during the feeding process. The gluing device 3 is used for gluing the side of the unit narrow board 4.

The transverse chain feeding device 1 includes a fixed chain transport mechanism 11, a movable chain transport mechanism 12, a horizontal linear rolling guide rail 13, a rolling slide block 14, guide wheels 15 and a transverse frame 16, wherein a front end of the fixed chain transport mechanism 11 is fixedly installed on a ground by a support leg, and a rear end is supported on the longitudinal feed frame 28 in the longitudinal roller feeding device 2. A front end of the movable chain transport mechanism 12 is supported on the ground by a support leg and a caster 122, a rear end is supported on the horizontal linear rolling guide rail 13 by the rolling slide block 14, the horizontal linear rolling guide rail 13 is fixed on the transverse frame 16, and the transverse frame 16 is fixed on the ground; and the movable chain transport mechanism 12 is capable to move along the horizontal linear rolling guide rail 13, so as to fit the unit narrow board 4 with different length. There are eight of the guide wheels 15 in total, which are arranged vertically along the axes of the guide wheels 15, arranged along a longitudinal feed direction of the unit narrow board 4, and fixed on the top of the transverse frame 16 to limit a continuous transverse motion of the unit narrow board 4 and serve as a guide reference for a longitudinal feed of the unit narrow board 4.

The longitudinal roller feeding device 2 includes a lifting power roller assembly 21, front pneumatic compression roller assemblies 22, a longitudinal feed roller assembly 23, rear pneumatic compression roller assemblies 29, guide rollers 24, a first sensor 25, a second sensor 26, a third sensor 27, a longitudinal feed frame 28, a first sensor bracket 281, a second sensor bracket 282 and a third sensor bracket 283.

Further, the lifting power roller assembly 21 includes two lifting power rollers 211, two sets of lifting slide blocks 212, two vertical linear guide rails 213, a lifting power roller motor 214, a chain wheel 215, a first chain 216, a lifting cylinder 217 and a lifting slide seat 218, wherein the two lifting power rollers 211, the lifting power roller motor 214 and a chain drive pair composed of the chain wheel 215 and the first chain 216 are arranged on the lifting slide seat 218; the lifting power roller motor 214 drives the lifting power roller 211 to rotate through the chain drive pair composed of the chain wheel 215 and the first chain 216, and a speed of the lifting power roller motor 214 is stepless adjusted. The two vertical linear guide rails 213 are fixed at a lower part of the longitudinal feed frame 28, and the lifting slide seat 218 is installed on the two vertical linear guide rails 213 through the two sets of lifting slide blocks 212. A cylinder barrel of the lifting cylinder 217 is arranged at the lower part of the longitudinal feed frame 28, a piston rod of the lifting cylinder 217 is connected with a lower part of the lifting slide seat 218, and the lifting cylinder 217 drives the lifting slide seat 218 to rise and fall along the two vertical linear guide rails 213, so as to control the two lifting power rollers 211 to rise or fall. The two lifting power rollers 211 are respectively located on both sides of a rear end of the fixed chain transport mechanism 11.

Further, there are two sets of the front pneumatic compression roller assemblies 22, which are installed on an upper part of the longitudinal feed frame 28 and located above an upper part of the lifting power roller assembly 21, respectively corresponding to the two lifting power rollers 211.

Further, the longitudinal feed roller assembly 23 includes a longitudinal feed motor 231, a coupling 232, six worm gear reducers 233, and six longitudinal feed rollers 234, wherein the longitudinal feed motor 231 is connected with a worm of a sixth worm gear reducer 233 along the longitudinal feed direction of the unit narrow board 4, and the worms of two adjacent worm gear reducers 233 are connected through the coupling 232. Each of the six longitudinal feed rollers 234 is installed on a worm gear shaft of each of the six worm gear reducers 233, and the longitudinal feed motor 231 and the six worm gear reducers 233 are arranged on the upper part of the longitudinal feed frame 28. The installation heights of the six worm gear reducers 233 are identical, and the installation heights of the six longitudinal feed rollers 234 are identical. The six longitudinal feed rollers 234 are driven by the longitudinal feed motor 231 through the six worm gear reducers 233, and the speed and the rotation direction of the six longitudinal feed rollers 234 are the same. The speed of the longitudinal feed motor 231 is capable to be adjusted steplessly. The diameter of the six longitudinal feed rollers 234 is the same as that of the two lifting power rollers 211.

Further, there are six sets of the rear pneumatic compression roller assemblies 29, which are installed on the upper part of the longitudinal feed frame 28 and located above the longitudinal feed roller assembly 23, respectively corresponding to the six longitudinal feed rollers 234.

Further, there are six of the guide rollers 24, axes of six of the guide rollers 24 are vertically arranged; the guide rollers 24 are installed on the longitudinal feed frame 28 and arranged in the same line with the eight of the guide wheels 15, and a diameter of the guide rollers 24 is the same as that of the guide wheels 15, which are configured to provide a longitudinal feed reference for the unit narrow board 4.

Further, along the longitudinal feed direction of the unit narrow board 4, the first sensor 25 is located between a first front compression roller with bearing 2241 and a second front compression roller with bearing 2242, and is arranged on the upper part of the longitudinal feed frame 28 through the first sensor bracket 281. The second sensor 26 is located between the second front compression roller with bearing 2242, and the first rear compression roller with bearing 2941, and is installed on the upper part of the longitudinal feed frame 28 through the second sensor bracket 282. The third sensor 27 is located between the second rear compression roller with bearing 2942 and the third rear compression roller with bearing 2943, and is installed on the upper part of the longitudinal feed frame 28 through the third sensor bracket 283.

The gluing device 3 includes a glue pump 31, a glue barrel 32, a glue application head 33, a glue delivery hose 34, a slide table fixed frame 35, and a pneumatic slide table 36. Wherein the pneumatic slide table 36 includes a slide table cylinder 361, a slide table guide rail 362, and a slide table seat 363; an upper surface of the slide table cylinder 361 is provided with a sliding groove matched with the slide table guide rail 362; the slide table seat 363 is fixed on the slide table fixed frame 35, and the slide table fixed frame 35 is fixed on the longitudinal feed frame 28; along the longitudinal feed direction of the unit narrow board 4, the gluing device 3 is located between the fourth longitudinal feed roller 234 and the fifth longitudinal feed roller 234 in the longitudinal feed roller assembly 23; a first glue inlet of the glue pump 31 is connected to the glue barrel 32 through a pipe, one end of the glue delivery hose 34 is connected to the glue outlet of the glue pump 31, and the other end is connected to the glue application head 33. The rotation speed of the glue pump 31 is capable to be adjusted steplessly. An upper part of the glue application head 33 is fixed on a lower surface of a cylinder block of the slide table cylinder 361, and the cylinder block of the slide table cylinder 361 is suspended on the slide table guide rail 362 through a sliding groove on the upper surface of the slide table cylinder 361. The slide table cylinder 361 is a double cylinder parallel piston type single-piston rod double-acting cylinder, and a piston rod of the slide table cylinder 361 is connected with the slide table seat 363. The cylinder block of the slide table cylinder 361 is movable, so as to make the glue application head 33 to move in the direction perpendicular to the longitudinal feed direction of the unit narrow board 4. Along the longitudinal feed direction of the unit narrow board 4, when a rodless cavity of the slide table cylinder 361 is filled with compressed air, a front end face of the glue application head 33 moves to a glue application position 2 mm to a left side of a guide surface composed of six of the guide rollers 24, waiting for the unit narrow board 4.

Further, the glue application head 33 is a hollow structure, a rear end face of the glue application head 33 is provided with a second glue inlet, a front end face of the glue application head 33 is a vertical plane parallel to the longitudinal feed direction of the unit narrow board 4, and there are chamfered inclined planes between the front end face and the two sides of the glue application head 33. A plurality of horizontal glue guiding grooves with identical width and depth vertically arranged and distributed from a middle to a left on the front end face, and a spacing between two adjacent horizontal glue guiding grooves is equal. Small round holes for glue liquid discharge are provided at a right end of each of the plurality of horizontal glue guiding grooves, the small round holes are communicated with a chamber in the glue application head 33, and all the small round holes are arranged on the same vertical line. The right end of each of the plurality of horizontal glue guiding grooves is a semi-circular closed structure, while the left end of each of the plurality of horizontal glue guiding grooves is an open structure, so as to guide glue liquid discharged from the small round holes, so that the glue liquid adhered to a side of the unit narrow board 4 forms parallel glue lines.

Optional, the fixed chain transport mechanism 11 includes a first servo drive unit 111, a first edge baffle 112 and a first conveyor chain assembly 113; the first conveyor chain assembly 113 includes a second chain, a driving chain wheel, a driven chain wheel, a chain carrier plate and a support plate, and the first conveyor chain assembly 113 is driven by the first servo drive unit 111; along the transverse feed direction of the unit narrow board 4, the first edge baffle 112 is located on a left side of the first conveyor chain assembly 113 and configured to align a left end of the unit narrow board 4.

Optional, the movable chain transport mechanism 12 includes a second servo drive unit 121, a caster 122, a second edge baffle 123 and a second conveyor chain assembly 124; a structure of the second conveyor chain assembly 124 is the same as that of the first conveyor chain assembly 113, and the second conveyor chain assembly 124 is driven by the second servo drive unit 121; along the transverse feed direction of the unit narrow board 4, the second edge baffle 123 is located on a right side of the second conveyor chain assembly 124 and configured to limit a right movement of the unit narrow board 4; and the running speed and direction of the second conveyor chain assembly 124 are consistent with those of the first conveyor chain assembly 113.

Optional, each of the front pneumatic compression roller assemblies 22 includes a front compression cylinder 221, a front fisheye joint 222, a front compression roller seat 223, a front compression roller with bearing 224, a front rolling slide block 225, a front rolling guide rail 226; the front compression cylinder 221 is fixed on a beam at the upper part of the longitudinal feed frame 28, a piston rod of the front compression cylinder 221 is connected with the front compression roller seat 223 through the front fisheye joint 222, the front compression roller with bearing 224 is installed on the front compression roller seat 223 through a shaft, the front compression roller seat 223 is connected with the front rolling slide block 225, the front rolling slide block 225 is installed on the front rolling guide rail 226, and the front rolling guide rail 226 is vertically fixed on the upper part of the longitudinal feed frame 28, the front compression cylinder 221 is capable to drive the front compression roller with bearing 224 to rise and fall, so as to realize the compression to the unit narrow board 4. The structure and installation method of each of the rear pneumatic compression roller assemblies 29 are the same as those of the front pneumatic compression roller assemblies 22. Each of the rear pneumatic compression roller assemblies 29 includes a rear compression cylinder 291, a rear fisheye joint 292, a rear compression roller seat 293, a rear compression roller with bearing 294, a rear rolling slide block, and a rear rolling guide rail; the rear compression cylinder 291 is fixed on a beam at the upper part of the longitudinal feed frame 28, a piston rod of the rear compression cylinder 291 is connected with the rear compression roller seat 293 through the rear fisheye joint 292, the rear compression roller with bearing 294 is installed on the rear compression roller seat 293 through a shaft, the rear compression roller seat 293 is connected with the rear rolling slide block, the rear rolling slide block is installed on the rear rolling guide rail, and the rear rolling guide rail is vertically fixed on the upper part of the longitudinal feed frame 28, the rear compression cylinder 291 is capable to drive the rear compression roller with bearing 294 to rise and fall, so as to realize the compression to the unit narrow board 4.

Optional, a height of the glue application head 33 meets a requirement of a maximum thickness of the unit narrow board 4, and the number of small round holes for gluing on a front end face of the glue application head 33 is determined according to the thickness of the unit narrow board 4. When the specification of the thickness of the unit narrow board 4 changes, the glue application head 33 can be replaced with a corresponding number of small round holes for glue liquid discharge.

A working method of the unit narrow board glue application device suitable for high-frequency hot pressing of solid wood edge glued panel, including the following steps:

Step 1, starting the longitudinal feed motor 231 and the lifting power roller motor 214 to rotate the six longitudinal feed rollers 234 and the two lifting power rollers 211, and adjusting the rotation speed; then starting the first servo drive unit 111 and the second servo drive unit 121 to make the fixed chain transport mechanism 11 and the movable chain transport mechanism 12 operate synchronously, and adjusting the operation speed; injecting compressed air into a rod cavity of the lifting cylinder 217 to lower the two lifting power rollers 211 to a lowest initial position; at the same time, injecting compressed air into rod cavities of the front compression cylinder 221 of the two sets of the front pneumatic compression roller assemblies 22 located above the lifting power roller assembly 21, so that the two front compression rollers with bearings 224 are lifted to a highest initial position; then injecting compressed air into the rodless cavities of the rear compression cylinders 291 of the six sets of rear pneumatic compression roller assemblies 29 located above the longitudinal feed roller assembly 23 to lower six rear compression rollers with bearings 294 to a predetermined working height; injecting compressed air into a rod cavity of the slide table cylinder 361 to make the glue application head 33 at an initial position on a right side; setting the rotation speed of the glue pump 31 to control glue liquid of the glue pump 31 according to requirements of a longitudinal feed speed and a glue amount of the unit narrow board 4.

Step 2, placing a plurality of unit narrow boards 4 on the transverse chain feeding device 1 by a manipulator or other loading device, and a left end of the unit narrow board 4 is aligned with the first edge baffle 112; the unit narrow board 4 is transferred to a rear end of the transverse chain feeding device 1, so that a side of the unit narrow board 4 to be glued is close to the guide wheels 15 and the guide rollers 24; along the longitudinal feed direction of the unit narrow board 4, a front section of the unit narrow board 4 is located at the lifting power roller assembly 21.

Step 3, sending, by a control system, a signal to control the first servo drive unit 111 and the second servo drive unit 121 to stop synchronously when the first sensor 25 detects that the unit narrow board 4 reaches the rear end of the transverse chain feeding device 1, so as to stop a transverse feeding movement; at the same time, the lifting power roller assembly 21 is lifted under an action of the lifting cylinder 217, so that the height of the two lifting power rollers 211 is the same as that of the six longitudinal feed rollers 234; at the same time, the two front compression rollers with bearings 224 located above the lifting power roller assembly 21 are driven down by the front compression cylinder 221, and then to press on an upper surface of the unit narrow board 4, so that the unit narrow board 4 starts a longitudinal feed motion under a longitudinal feed driving force; when the unit narrow board 4 enters a region of the longitudinal feed roller assembly 23, the longitudinal feed motion continues under an action of the longitudinal feed rollers 234 and the six rear compression rollers with bearings 294 located above the longitudinal feed rollers 234.

Step 4, sending, by the control system, a control signal to the lifting cylinder 217 and the front compression cylinder 221, the glue pump 31, and the slide table cylinder 361 when the third sensor 27 detects a front end of the unit narrow board 4, so as to control the two lifting power rollers 211 to lower and the two front compression rollers with bearings 224 to lift, to disengage from the unit narrow board 4 and return to the initial positions; at the same time, the piston rod of the slide table cylinder 361 is controlled to stretch out, and the cylinder block moves to a glue position with the glue application head 33 towards the unit narrow board 4; at the same time, the glue pump 31 is controlled to start and supply glue liquid to the glue application head 33; with the longitudinal feed of the unit narrow board 4, when the front end of the unit narrow board 4 contacts the chamfered inclined planes of the glue application head 33, a right lateral thrust is generated on the glue application head 33, which overcomes a force of the slide table cylinder 361 and makes the glue application head 33 move backward to the right, so that a front end face of the glue application head 33 is floating and pressing on the side of the unit narrow board 4 under an action of the slide table cylinder 361; the glue liquid is discharged from the small round holes on the front end face of the glue application head 33 and adhered to the side of the unit narrow board 4, with the longitudinal feed of the unit narrow board 4, the glue liquid forms multiple horizontal glue lines with equal spacing on the side of the unit narrow board 4, and the glue lines are evenly distributed on a gluing surface under an action of pressure during the subsequent assembly and hot pressing; with continued feeding of the unit narrow board 4 along the longitudinal direction, sending, by the control system, a delay control signal to the glue pump 31 when the third sensor 27 detects a rear end of the unit narrow board 4, so that the side of the unit narrow board 4 is completely glued, and then the glue pump 31 is controlled to stop, and the piston rod of the slide table cylinder 361 is retraced, and the cylinder block moves back with the glue application head 33 to separate away from the unit narrow board 4, so as to complete the gluing of the first unit narrow board 4.

Step 5, sending, by the control system, a signal to the transverse chain feeding device 1 to make the first servo drive unit 111 and the second servo drive unit 121 start synchronously again when the second sensor 26 detects that the rear end of the unit narrow board 4 is passing, so that the fixed chain transport mechanism 11 and the movable chain transport mechanism 12 resume operation, and the unit narrow board 4 is moved laterally by a distance of a width of the unit narrow board 4; at the same time, the longitudinal roller feeding device 2 and the gluing device 3 are started again to carry out a transverse feeding, a longitudinal feeding and a side glue application of a next unit narrow board 4, so as to cycle back and forth.

The above description is one of the embodiments of the disclosure, and the modified solutions which is not departed from the spirit of the present disclosure made by the ordinary skilled person in the art, are still within the scope of the disclosure.

Obviously, the described embodiments are only part of the embodiments of the disclosure, not all of them. Based on the embodiments in the disclosure, other embodiments obtained by ordinary skilled person in the art are within the scope of the disclosure.

What is claimed is:

1. An unit narrow board glue application device suitable for high-frequency hot pressing of solid wood edge glued panel, comprising a transverse chain feeding device (1), a longitudinal roller feeding device (2) and a gluing device (3);

the transverse chain feeding device (1) comprises a fixed chain transport mechanism (11), a movable chain transport mechanism (12), a horizontal linear rolling guide rail (13), a rolling slide block (14), guide wheels (15) and a transverse frame (16), wherein a front end of the fixed chain transport mechanism (11) is fixedly installed on a ground by a support leg, and a rear end is supported on a longitudinal feed frame (28) in the longitudinal roller feeding device (2); a front end of the movable chain transport mechanism (12) is supported on the ground by a support leg and a caster (122), a rear end is supported on the horizontal linear rolling guide rail (13) by the rolling slide block (14), the horizontal linear rolling guide rail (13) is fixed on the transverse frame (16), and the transverse frame (16) is fixed on the ground; the movable chain transport mechanism (12) is capable to move along the horizontal linear rolling guide rail (13); there are eight of the guide wheels (15) in total, which are arranged vertically along the axes of the guide wheels (15), arranged along a longitudinal feed direction of the unit narrow board (4), and fixed on a top of the transverse frame (16) to limit a continuous transverse motion of the unit narrow board (4) and serve as a guide reference for a longitudinal feed of the unit narrow board (4);

the longitudinal roller feeding device (2) comprises a lifting power roller assembly (21), front pneumatic compression roller assemblies (22), a longitudinal feed roller assembly (23), rear pneumatic compression roller assemblies (29), guide rollers (24), a first sensor (25), a second sensor (26), a third sensor (27), the longitudinal feed frame (28), a first sensor bracket (281), a second sensor bracket (282) and a third sensor bracket (283);

the lifting power roller assembly (21) comprises two lifting power rollers (211), two set of lifting slide blocks (212), two vertical linear guide rails (213), a lifting power roller motor (214), a chain wheel (215), a first chain (216), a lifting cylinder (217) and a lifting slide seat (218), wherein the two lifting power rollers (211), the lifting power roller motor (214) and a chain drive pair composed of the chain wheel (215) and the first chain (216) are arranged on the lifting slide seat (218); the lifting power roller motor (214) drives the lifting power roller (211) to rotate through the chain drive pair composed of the chain wheel (215) and the first chain (216), and a speed of the lifting power roller motor (214) is stepless adjusted; the two vertical linear guide rails (213) are fixed at a lower part of the longitudinal feed frame (28), and the lifting slide seat (218) is installed on the two vertical linear guide rails (213) through the two sets of lifting slide blocks (212); a cylinder barrel of the lifting cylinder (217) is arranged at the lower part of the longitudinal feed frame (28); a piston rod of the lifting cylinder (217) is connected with a lower part of the lifting slide seat (218); the lifting cylinder (217) drives the lifting slide seat (218) to rise and fall along the two vertical linear guide rails (213), so as to control the two lifting power rollers (211) to rise or fall; the two lifting power rollers (211) are respectively located on both sides of a rear end of the fixed chain transport mechanism (11);

there are two sets of the front pneumatic compression roller assemblies (22), which are installed on an upper part of the longitudinal feed frame (28) and located above an upper part of the lifting power roller assembly (21), respectively corresponding to the two lifting power rollers (211);

the longitudinal feed roller assembly (23) comprises a longitudinal feed motor (231), a coupling (232), six worm gear reducers (233), and six longitudinal feed rollers (234), wherein the longitudinal feed motor (231) is connected with a worm of a sixth worm gear reducer (233) along the longitudinal feed direction of the unit narrow board (4), and the worms of two adjacent worm gear reducers (233) are connected through the coupling (232); each of the six longitudinal feed rollers (234) is installed on a worm gear shaft of each of the six worm gear reducers (233); the longitudinal feed motor (231) and the six worm gear reducers (233) are arranged on the upper part of the longitudinal feed frame (28); installation heights of the six worm gear reducers (233) are identical, and the installation heights of the six longitudinal feed rollers (234) are identical; the six longitudinal feed rollers (234) are driven by the longitudinal feed motor (231) through the six worm gear reducers (233), and a speed and a rotation direction of the six longitudinal feed rollers (234) are the same; a speed of the longitudinal feed motor (231) is capable to be adjusted steplessly; a diameter of the six longitudinal feed rollers (234) is the same as that of the two lifting power rollers (211);

there are six sets of the rear pneumatic compression roller assemblies (29), which are installed on the upper part of the longitudinal feed frame (28) and located above the longitudinal feed roller assembly (23), respectively corresponding to the six longitudinal feed rollers (234);

there are six of the guide rollers (24), axes of six of the guide rollers (24) are vertically arranged; the guide rollers (24) are installed on the longitudinal feed frame (28) and arranged in the same line with the eight of the guide wheels (15), and a diameter of the guide rollers (24) is the same as that of the guide wheels (15), which are configured to provide a longitudinal feed reference for the unit narrow board (4);

the gluing device (3) comprises a glue pump (31), a glue barrel (32), a glue application head (33), a glue delivery hose (34), a slide table fixed frame (35), and a pneumatic slide table (36), wherein the pneumatic slide table (36) comprises a slide table cylinder (361), a slide table guide rail (362), and a slide table seat (363); an upper surface of the slide table cylinder (361) is provided with a sliding groove matched with the slide table guide rail (362); the slide table seat (363) is fixed on the slide table fixed frame (35), and the slide table fixed frame (35) is fixed on the longitudinal feed frame (28); along the longitudinal feed direction of the unit narrow board (4), the gluing device (3) is located between the fourth longitudinal feed roller (234) and the fifth longitudinal feed roller (234) in the longitudinal feed roller assembly (23); a first glue inlet of the glue pump (31) is connected to the glue barrel (32) through a pipe, one end of the glue delivery hose (34) is connected to the glue outlet of the glue pump (31), and the other end is connected to the glue application head (33); a rotation speed of the glue pump (31) is capable to be adjusted steplessly; an upper part of the glue application head (33) is fixed on a lower surface of a cylinder block of the slide table cylinder (361), the cylinder block of the slide table cylinder (361) is suspended on the slide table guide rail (362) through a sliding groove on the upper surface of the slide table cylinder 361, the slide table cylinder (361) is a double cylinder parallel piston type single-piston rod double-acting cylinder, and a piston rod of the slide table cylinder (361) is connected with the slide table seat (363); the cylinder block of the slide table cylinder (361) is movable, so as to make the glue application head (33) to move in the direction perpendicular to longitudinal feed direction of the unit narrow board (4); along the longitudinal feed direction of the unit narrow board (4), when a rodless cavity of the slide table cylinder (361) is filled with compressed air, a front end face of the glue application head (33) moves to a glue application position 2 mm to a left side of a guide surface composed of six of the guide rollers (24).

2. The unit narrow board glue application device suitable for high-frequency hot pressing of solid wood edge glued panel according to claim 1, wherein along the longitudinal feed direction of the unit narrow board (4), the first sensor (25) is located between a first front compression roller with bearing (2241) and a second front compression roller with bearing (2242), and is arranged on the upper part of the longitudinal feed frame (28) through the first sensor bracket (281); the second sensor (26) is located between the second front compression roller with bearing (2242) and the first rear compression roller with bearing (2941), and is installed on the upper part of the longitudinal feed frame (28) through the second sensor bracket (282); the third sensor (27) is located between the second rear compression roller with bearing (2942) and the third rear compression roller with bearing (2943), and is installed on the upper part of the longitudinal feed frame (28) through the third sensor bracket (283).

3. The unit narrow board glue application device suitable for high-frequency hot pressing of solid wood edge glued panel according to claim 1, wherein the glue application head (33) is a hollow structure, a rear end face of the glue application head (33) is provided with a second glue inlet, a front end face of the glue application head (33) is a vertical plane parallel to the longitudinal feed direction of the unit narrow board (4), and there are chamfered inclined planes between the front end face and the two sides of the glue application head (33); a plurality of horizontal glue guiding grooves with identical width and depth vertically arranged and distributed from a middle to a left on the front end face, and a spacing between two adjacent horizontal glue guiding grooves is equal; small round holes for glue liquid discharge are provided at a right end of each of the plurality of horizontal glue guiding grooves, the small round holes are communicated with a chamber in the glue application head (33), and all the small round holes are arranged on the same vertical line; the right end of each of the plurality of horizontal glue guiding grooves is a semi-circular closed structure, while the left end of each of the plurality of horizontal glue guiding grooves is an open structure, so as to guide glue liquid discharged from the small round holes, so that the glue liquid adhered to a side of the unit narrow board (4) forms parallel glue lines.

4. The unit narrow board glue application device suitable for high-frequency hot pressing of solid wood edge glued panel according to claim 1, wherein the fixed chain transport mechanism (11) comprises a first servo drive unit (111), a first edge baffle (112) and a first conveyor chain assembly (113); the first conveyor chain assembly (113) comprises a second chain, a driving chain wheel, a driven chain wheel, a chain carrier plate and a support plate, and the first conveyor chain assembly (113) is driven by the first servo drive unit (111); along the transverse feed direction of the unit narrow board (4), the first edge baffle (112) is located on a left side of the first conveyor chain assembly (113) and configured to align a left end of the unit narrow board (4).

5. The unit narrow board glue application device suitable for high-frequency hot pressing of solid wood edge glued panel according to claim 1, wherein the movable chain transport mechanism (12) comprises a second servo drive unit (121), the caster (122), a second edge baffle (123) and a second conveyor chain assembly (124); a structure of the second conveyor chain assembly (124) is the same as that of the first conveyor chain assembly (113), and the second conveyor chain assembly (124) is driven by the second servo drive unit (121); along the transverse feed direction of the unit narrow board (4), the second edge baffle (123) is located on a right side of the second conveyor chain assembly (124) and configured to limit a right movement of the unit narrow board (4); and the running speed and direction of the second conveyor chain assembly (124) are consistent with those of the first conveyor chain assembly (113).

6. The unit narrow board glue application device suitable for high-frequency hot pressing of solid wood edge glued panel according to claim 1, wherein each of the front pneumatic compression roller assemblies (22) comprises a front compression cylinder (221), a front fisheye joint (222), a front compression roller seat (223), a front compression roller with bearing (224), a front rolling slide block (225), a front rolling guide rail (226); the front compression cylinder (221) is fixed on a beam at the upper part of the longitudinal feed frame (28), a piston rod of the front compression cylinder (221) is connected with the front compression roller seat (223) through the front fisheye joint (222), the front compression roller with bearing (224) is installed on the front compression roller seat (223) through a shaft, the front compression roller seat (223) is connected with the front rolling slide block (225), the front rolling slide block (225) is installed on the front rolling guide rail (226), and the front rolling guide rail (226) is vertically fixed on the upper part of the longitudinal feed frame (28), the front compression cylinder (221) is capable to drive the front compression roller with bearing (224) to rise and fall; and the structure and installation method of each of the rear pneumatic compression roller assemblies (29) are the same as those of the front pneumatic compression roller assemblies (22).

7. The unit narrow board glue application device suitable for high-frequency hot pressing of solid wood edge glued panel according to claim 1, wherein a height of the glue application head (33) meets a requirement of a maximum thickness of the unit narrow board (4), and the number of small round holes for gluing on a front end face of the glue application head (33) is determined according to the thickness of the unit narrow board (4).

* * * * *